US006954579B2

(12) United States Patent  
Hsu

(10) Patent No.: US 6,954,579 B2
(45) Date of Patent: Oct. 11, 2005

(54) METHOD AND APPARATUS FOR CHANGING THE OPTICAL INTENSITY OF AN OPTICAL SIGNAL USING A MOVABLE LIGHT TRANSMISSIVE STRUCTURE

(76) Inventor: Ying Wen Hsu, 6455 Frampton Cir., Huntington Beach, CA (US) 92648

( * ) Notice: Subject to any disclaimer, the term of this patent is extended or adjusted under 35 U.S.C. 154(b) by 419 days.

(21) Appl. No.: 09/998,867

(22) Filed: Nov. 29, 2001

(65) Prior Publication Data

US 2002/0054748 A1 May 9, 2002

Related U.S. Application Data

(63) Continuation-in-part of application No. 09/837,829, filed on Apr. 17, 2001, now Pat. No. 6,690,847, and a continuation-in-part of application No. 09/837,817, filed on Apr. 17, 2001, now Pat. No. 6,647,170.
(60) Provisional application No. 60/241,762, filed on Oct. 20, 2000, and provisional application No. 60/233,672, filed on Sep. 19, 2000.

(51) Int. Cl.[7] ............................................... G02B 6/26
(52) U.S. Cl. .......................... 385/140; 385/15; 385/16; 385/18; 385/31; 385/17
(58) Field of Search ........................... 385/140, 15, 16, 385/17, 18, 31, 36, 33, 34, 52, 57, 97

(56) References Cited

U.S. PATENT DOCUMENTS

| 4,693,547 | A |   | 9/1987  | Soref et al. ............. 350/96.13 |
| 5,095,519 | A | * | 3/1992  | Dorsey ..................... 385/140 |
| 5,235,672 | A |   | 8/1993  | Carson ..................... 395/24 |
| 5,245,458 | A |   | 9/1993  | Taylor ..................... 359/108 |
| 5,727,099 | A | * | 3/1998  | Harman ..................... 385/52 |
| 5,757,986 | A |   | 5/1998  | Crampton et al. ............. 385/2 |
| 5,761,350 | A |   | 6/1998  | Koh ......................... 385/14 |
| 5,828,800 | A |   | 10/1998 | Henry et al. ................ 385/20 |
| 5,864,643 | A | * | 1/1999  | Pan ......................... 385/22 |
| 5,923,798 | A |   | 7/1999  | Aksyuk et al. .............. 385/19 |
| 5,990,473 | A |   | 11/1999 | Dickey et al. ........ 250/231.13 |
| 6,072,924 | A |   | 6/2000  | Sato et al. ................. 385/18 |
| 6,102,582 | A | * | 8/2000  | Espindola et al. ........... 385/57 |
| 6,137,941 | A | * | 10/2000 | Robinson ................... 385/140 |
| 6,148,124 | A |   | 11/2000 | Aksyuk et al. .............. 385/24 |
| 6,205,267 | B1 |   | 3/2001  | Aksyuk et al. .............. 385/19 |
| 6,647,170 | B2 | * | 11/2003 | Hsu ......................... 385/17 |
| 6,690,847 | B2 | * | 2/2004  | Hsu ......................... 385/16 |
| 2002/0054748 | A1 | * | 5/2002 | Hsu ......................... 385/140 |

FOREIGN PATENT DOCUMENTS

EP          1004910 A2    5/2000    ........... G02B/6/35

OTHER PUBLICATIONS

Benaissa, K.; and Nathan, A.; "Silicon Anti–Resonant Reflecting Optical Waveguides for Sensor Applications;" *Journal of Sensors and Actuators (A Physical)*, vol. A65, 33–44, 1998.

(Continued)

*Primary Examiner*—Brian M. Healy

(57) ABSTRACT

An improved device, which may act as a variable attenuator, changes the optical intensity of an optical signal by moving a platform onto which a light transmissive structure such as a waveguide is disposed. The light transmissive structure is positioned and aligned to receive an optical signal and positioned and aligned to transmit the optical signal. By moving the light transmissive structure into a position of reduced alignment with an input source, the light transmissive structure may receive less or none of the optical signal, thereby attenuating it. Alternatively, by moving the light transmissive structure into a position of reduced alignment with an output structure, the light transmissive structure may transmit less or none of the optical signal, thereby attenuating its transmission.

73 Claims, 7 Drawing Sheets

OTHER PUBLICATIONS

Brown, K.S.; Taylor, B.J.; Dawson; J.M.; Hornak, L.A.; "Polymer Waveguide Co–integration With Microelectromechanical Systems (MEMS) for Integrated Optical Metrology;" *Proceedings of the SPIE (The International Society for Optical Engineering)*, vol. 3276, 1998.

Burcham, Kevin E.; and Boyd, Joseph T.; "Freestanding, Micromachined, Multimode Silicon Optical Waveguides at λ=1.3 μm for Microelectromechanical System Technology;" *Journal of Applied Optics*, vol. 37, No. 36, Dec. 20, 1998.

Churenkov, A.V.; "Silicon Micromechanical Optical Waveguide for Sensing and Modulation;" *Journal of Sensors and Actuators (A Physical)*, vol. A57, No. 1, Oct. 1996.

Cook, J.P.D.; Este, G.O.; Shepherd, F.R.; et al.; "Stable, Low–Loss Optical Waveguides and Micromirrors Fabricated in Acrylate Polymers" *Applied Optics Journal*, vol. 37, No. 7, Mar. 1, 1998.

Cornett, Kimberly T.; Heritage, Jonathan P.; Solgaard, Olav; "Compact Optical Delay Line Based on Scanning Surface Micromachined Polysilicon Mirrors;" *2000 IEEE/LEOS International Conference on Optical MEMS*, Kauai, Hawaii, Aug. 21–24, 2000.

de Labachelerie, M.; Kaou, N.; et al.; "A Micromachined Connector for the Coupling of Optical Waveguides and Ribbon Optical Fibers;" *Journal of Sensors and Actuators (A Physical)*, vol. A89, No. 1–2, Mar. 20, 2001.

Eng, Terry T.H.; Kan, Sidney C.; and Wong, George K.L.; "Voltage–Controlled Micromechanical SOI Optical Waveguides;" *IEEE TENCON, IEEE Region 10 International Conference on Microelectronics and VLSL—"Asia Pacific Microelectronics 2000"—Proceedings*, 1995.

Eng, Terry T.H.; Kan, Sidney C.; and Wong, George K.L.; "Surface–Micromachined Epitaxial Silicon Cantilevers as Movable Optical Waveguides on Silicon–on–Insulator Substrates;" *Journal on Sensors and Actuators A, Physical*, vol. A49, No. 1–2, Jun. 1995.

Eng, Terry T.H.; Kan, Sidney C.; and Wong, George K.L.; "Surface–Micromachined Movable SOI Optical Waveguides;" *Proceedings of the International Solid–State Sensors and Actuators Conference—Transducer*, 1995.

Gorecki, Christophe; "Optimization of Plasma–Deposited Silicon Oxinitride Films for Optical Channel Waveguides;" *Journal of Optics and Laser Engineering*, vol. 33, No. 1, Jan. 2000.

Haronian, D.; "Bottlenecks of Opto–MEMS;" *SPIE Proceedings—Micro–Opto–Electro–Mechanical Systems*, Glasgow, UK, May 22–23, 2000.

Haronian, D.; "Displacement Sensing Using Geometrical Modulation in Reflection Mode (GM–RM) of Coupled Optical Waveguides;" *Journal of Micromechanics and Microengineering*, vol. 8, No. 4, Dec. 1998.

Haronian, D.; "Suspended Optical Waveguide With In–Plane Degree of Freedom or Microelectro–Mechanical Applications;" *Electronics Letters*, vol. 34, No. 7, Apr. 2nd, 1998.

Hoffmann, Martin; Kopka, Peter; and Voges, Edgar; "Thermooptical Digital Switch Arrays in Silica–on–Silicon With Defined Zero–Voltage State;" *Journal of Lightwave Technology*, vol. 16, No. 3, Mar. 1998.

Jin, Young–Hyun; Seo, Kyoung–Sun; et al.; "An SOI Optical Microswitch Integrated With Silicon Waveguides and Touch–down Micromirror Actuators;" *2000 IEEE/LEOS International Conference on Optical MEMS*, Aug. 21–24, 2000.

Koyanagi, Mitsumasa; "Optical Interconnection Using Polyimide Waveguide for Multi–Chip Module;" *Proceedings of SPIE, Society of Photo–Optical Instrumentation Engineers*, San Jose, CA, 1996.

Kruger, Michiel V.P.; Guddal, Michael H.; et al.; "Low Power Wireless Readout of Autonomous Sensor Wafer Using MEMS Grating Light Modulator;" *2000 IEEE/LEOS International Conference on Optical MEMS*, Kauai, Hawaii, Aug. 21–24, 2000.

Kuwana, Yasuhiro; Hirose, Akinori; Kurino, Hiroyuki; et al.; "Signal Propagation Characteristics in Polyimide Optical Wave–guide With Micro–Mirrors for Optical Multichip Module;" *Japanese Journal of Applied Physics*, vol. 38, No. 4B, Apr. 1999.

Makihara, M.; "Microelectromechanical Intersecting Waveguide Optical Switch Based on Thermo–Capillarity;" *2000 IEEE/LEOS International Conference on Optical MEMS*, Kauai, Hawaii, Aug. 21–24, 2000.

Makihara, M.; Sato, Makoto; Shimokawa, Fusao; et al.; "Micromechanical Optical Switches Based on Thermocapillary Integrated in Waveguide Substrate;" *Journal of Lightwave Technology*, vol. 17, No. 1, Jan. 1999.

Makihara, M.; Shimokawa, F.; and Nishida, Y.; "Self–Holding Optical Waveguide Switch Controlled by Micromechanism;" *IEICE Trans. Electronics (Japan)*, vol. E80–C, No. 2, Feb. 1997.

Maruo, Shoji; Ikuta, Koji; and Ninagawa, Toshihide; "Multi–Polymer Microstereolithography for Hybride Opto–MEMS" has the same information as "Advanced Micro Sterelithography with Multi UV Polymers (System Development and Application to Three–Dimensional Optical Waveguides)," which is written in Japanese; *Journal of Transactions of the Institute of Electrical Engineers of Japan, Part E*, vol. 120–E, No. 7, Jul. 2000.

Matsumoto, Takuji; Kuwana, Yasuhiro; Hirose, Akinori; "Polyimide Optical Waveguide With Multi–Fan–Out For Multichip Module System;" *Proceedings from the Optoelectronic Interconnects V*, vol. 3288, San Jose, CA Jan. 28–29, 1998.

Matsumoto, Takuji; Fukuoka, Takeshi; Kurino, Hiroyuki; et al.; "Polyimide Optical Waveguide With Multi–Fan–Out for Multi–Chip Module Application;" *Proceedings of the 27th European Solid–State Device Research Conference*, France, Sep. 22–24, 1997.

Matsumoto, Takuji et al., "Polyimide Optical Waveguide with Multi–Fan–Out for Multi–Chip Module Application," *Jpn. J. Appl. Phys.*, vol. 36 (1997) Pt. 1, No. 38, pp. 1903–1906.

Moisel, Jorg; Guttmann, Joachim; Huber, Hans–Peter; "Optical Backplanes With Integrated Polymer Waveguides," *Journal of Optical Engineering*, vol. 39, No. 3, Mar. 2000.

Mueller, Raluca; Pavelescu; and Manea, Elena; "3D Microstructures Integrated With Optical Waveguides and Photodiodes on Silicon," *MELECOB 1998 9th Mediterranean Electromechanical Conference Proceedings*, vol. 1; May 18–20, 1998.

Namba, Tohru; Uehara, Akihito; et al.; "High–Efficiency Micromirrors and Branched Optical Waveguides on Si Chips;" *Japanese Journal of Applied Physics, Part I*, vol. 35, No. 2B, Aug. 21–24, 1995.

Oillier, Eric; Chabrol, Claude; et al.; "1 x 8 Micro–Mechanical Switches Based on Moving Waveguides for Optical Fiber Network Switching;" *2000 IEEE/LEOS International Conference on Optical MEMS*, Aug. 21–24, 2000.

Ollier, Eric; and Mottier, P.; "Micro–Opto–Electro–Mechanical Systems: Recent Developments and LEIT's Activities," *Proceedings of the SPIE—The International Society for Optical Engineering,* vol. 4076, May 22–24, 2000.

Shubin, I.; and Wa, P.L.K.; "Electrostatically Actuated 1 x 2 Micro–Mechanical Optic Switch;" *Electronics Letters,* vol. 37, No. 7; Mar. 29, 2001.

Storgaard–Larsen, Torben; "Plasma–Enhanced Chemical Vapor Deposited Silicon Oxynitride Films for Optical Waveguide Bridges for Use in Mechanical Sensors;" *Journal of the Electromechanical Society,* vol. 144, No. 4, Apr. 1997.

Voges, E.; Hoffmann, M.; "FBI Optical Waveguides on Silicon Combined With Micromechanical Structures;" *Advanced Applications of Lasers in Materials and Processing; LEOS Summer Optical Meeting,* 1996; IEEE, Piscataway, New Jersey, 96TH8154.

Yariv, A.; "Universal Relations for Coupling of Optical Power Between Microresonators and Dielectric Waveguides;" *Journal of Electronics Letters,* vol. 36, No. 4, Feb. 17, 2000.

Yokoyama, S.; Nagata, T.; and Kuroda, Y.; et al.; "Optical Waveguides on Silicon Chips;" *Journal of Vacuum Science & Technology A,* vol. 13, No. 3, May–Jun. 1995.

"5. Switching Fabric Technologies," *Packet Switch Architecture,* CS–534, Dept. of Computer Science, University of Crete, Greece (undated document, file last updated Apr. 2000 by M. Katevenis), http://archvlsi.ics.forth.gr/~kateveni/534/sec5.html, 35 pp.

\* cited by examiner

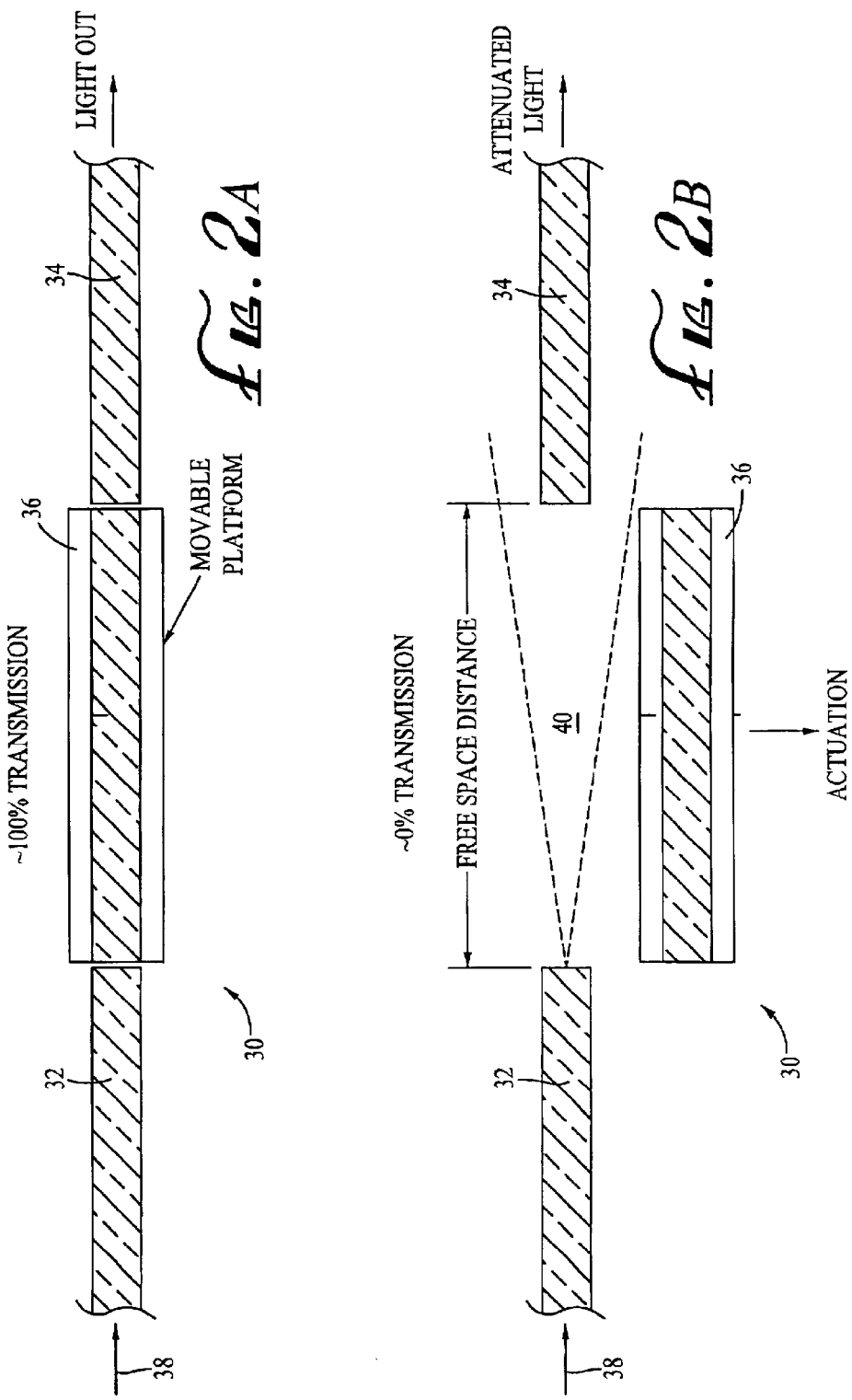

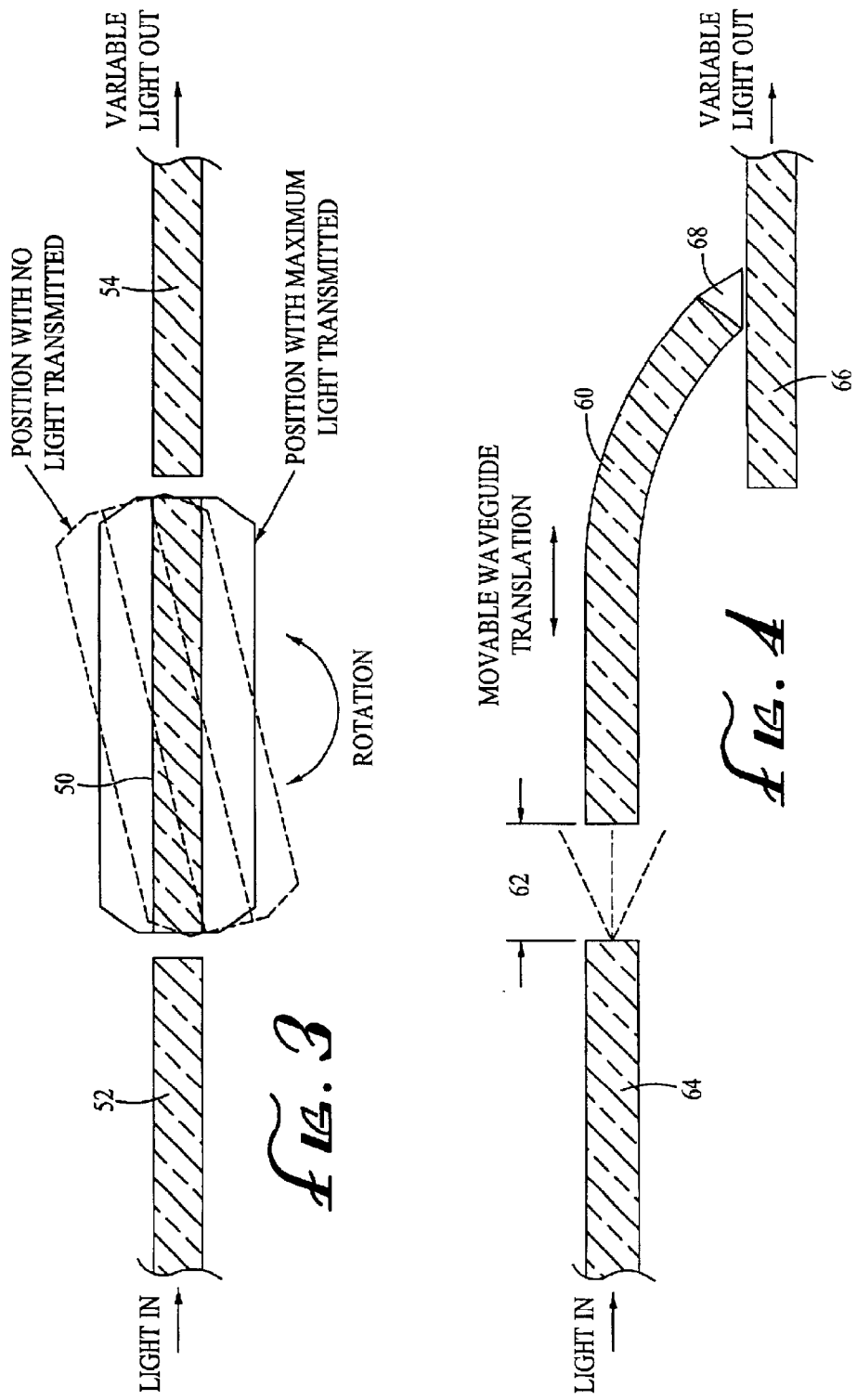

METHOD AND APPARATUS FOR CHANGING THE OPTICAL INTENSITY OF AN OPTICAL SIGNAL USING A MOVABLE LIGHT TRANSMISSIVE STRUCTURE

CROSS-REFERENCE TO RELATED APPLICATIONS

This patent application is a continuation-in-part and claims priority of the following related patent applications: (1) provisional U.S. Patent Application Ser. No. 60/233,672 by Ying Wen Hsu, filed on Sep. 19, 2000 and titled "Method For Switching Optical Signals Using Microstructures;" (2) provisional U.S. Patent Application Ser. No. 60/241,762 by Ying Wen Hsu, filed on Oct. 20, 2000, titled "Method for switching optical signals using microstructures;" (3) U.S. Patent Application Ser. No. 09/837,829, now U.S. Pat. No. 6,690,847 by Ying Wen Hsu filed on Apr. 17, 2001 and titled "Optical Switching Element Having Movable Optically Transmissive Microstructure;" (4) U.S. patent application Ser. No. 09/837,817 now U.S. Pat. No. 6,647,170, by Ying Wen Hsu, filed on Apr. 17, 2001 and titled "Optical Switching System That Uses Movable Microstructures To Switch Optical Signals In Three Dimensions," all patent applications of which are expressly incorporated herein by reference for all purposes.

FIELD OF THE INVENTION

The field of the invention is devices that change the optical intensity of an optical signal and in particular, devices that use a movable light transmissive structure to change the optical intensity of an optical signal.

BACKGROUND

There is a class of devices generally referred to as Variable Optical Attenuators (VOAs). A VOA is used to reduce the power of an optical signal so that the resulting power level is within the acceptable range of those devices or instruments working downstream from the VOA. For example, a VOA may be used to equalize the power levels of multiple optical signals before the signals are combined in a DWDM system (Dense Wavelength Division Multiplexing) for high-speed transport. This equalization is required because the multiplexed optical signals will be amplified before being transported an d y excessively high power signals could be lost due to saturation. VOAs may also be required after the signals are multiplexed in a DWDM system to reduce the output power, The reason is that the actual power is dependent on the number of active channels, which can vary over time.

A VOA is one of the key components used in fiber optic communication systems. During the past decade, the demand for higher bandwidth driven by the Internet has resulted in a need for mass-producible and low cost optical components. A successful strategy used to reduce cost is to design optical components by leveraging the well-established manufacturing processes taken from the semiconductor industry. A strong interest exists, therefore, to produce VOAs and other optical components from typical semiconductor materials such as silicon, silica, nitrite and others. New developments are also seeking to produce these components using active materials such as gallium arsenide because these materials can be used to produce light generating components. An ultimate goal is to integrate a maximum number of functions on a single substrate to minimize the manufacturing cost.

There are prior art methods for adjusting the output power of an optical signal. The most common way to adjust the power of an optical signal is by simply limiting the amount of light transmitted from one fiber to another fiber. This can be accomplished by inserting an object (optically opaque in the wavelength of interest) between the light-carrying fiber and the outgoing fiber. The optically opaque object, usually referred to as a shutter, can be moved in small distances such that the amount of light captured by the receiving fiber can be controlled precisely. Conventional VOAs move the shutter by using precise mechanical stages and motors that have resulted in large and expensive systems. Other techniques rely on optical properties of selective materials such as liquid crystals to affect the amount of light passing through the material. Electro-optics and thermo-optical effects have also been used to affect the amount of light transmitted.

More recently, it has been desirable to produce VOAs using materials and processes compatible with semiconductor manufacturing processes. FIG. 1 illustrates an example of a prior art approach where a miniature actuator 10 is fabricated directly on the silicon substrate 20. Light is conducted into the switching region by an optical fiber 22. A shutter 24 is positioned between the end of the input fiber 22 and the entrance of the output fiber 26. The shutter 24 is supported by an actuator/micro-mechanism 10 produced out of silicon. The actuator/micro-mechanism 10 moves the shutter in the direction indicated by the actuation arrow. Electrical interface pads 28 may be coupled to the actuator/micro-mechanism 10 in order to control the actuator/micro-mechanism 10. By moving the shutter 24, more or less of the light from the input optical fiber 22 can be allowed to pass into the output optical fiber 26. This approach is described in U.S. Pat. No. 6,173,105. A wide range of fabrication technologies referred to as MEMS processes (Micro-Electro Mechanical Systems) have been employed successfully to produce these micro-mechanisms. Different methods of actuation are available including electrostatic, thermal and magnetic. The use of MEMS technology allows precise control of the actuator/mechanism 10 as well as batch manufacturing processes.

One problem associated with a VOA based on the shutter approach is the difficulty of integrating it with optical systems that use waveguides. Waveguides, by contrast with shutters, are optically transmissive structures. In the typical semiconductor process, different layers of materials are sequentially deposited and patterned. In the shutter approach, the silicon shutter must be located on the same plane as the waveguides and also must be physically larger than the waveguides to provide effective blocking of light. These two requirements make it difficult to produce both shutter and waveguides in the same processing sequence. Although it is possible create the shutter and waveguides separately by breaking up the process and by selective masking, this approach increases potential misalignments and manufacturing complexity.

Ideally, a VOA design for integration with a waveguide-based system uses the same processing steps as that used to make waveguides. One choice is to introduce a mechanism into the waveguide that would modulate light. That can be achieved by introducing electro-optical, thermal, or acousto-optical effects into the waveguides. These methods, however, are limited to waveguides made out of certain active materials, which waveguides are generally difficult to manufacture. Another possibility is to use a waveguide with a movable section which acts as a shutter by doping the movable section of the waveguide so as to become opaque. However, all of these methods require significant deviations from standard waveguide manufacturing processes. Therefore, there is a need for a device that changes the optical intensity of an optical signal which uses standard waveguide manufacturing processes. There is also a need for a cost effective method of fabricating such a device.

SUMMARY OF THE INVENTION

Generally, the device changes the optical intensity of an optical signal by using a light transmissive structure such as a waveguide disposed on a movable platform.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIGS. 2A and 2B are schematic illustrations of an example embodiment of a device that changes the optical intensity of an optical signal by using a light transmissive structure such as a waveguide disposed on a movable platform, where FIG. 2A illustrates the movable platform in a first position and FIG. 2B illustrates the movable platform in a second position.

FIG. 3 is a schematic illustration of another example embodiment of a device that changes the optical intensity of an optical signal by using a light transmissive structure such as a waveguide disposed on a movable platform, where the movable platform rotates.

FIG. 4 is a schematic illustration of yet another example embodiment of a device that changes the optical intensity of an optical signal by using a light transmissive structure such as a waveguide disposed on a movable platform, where the movable platform is curved and has a prism coupler.

DETAILED DESCRIPTION OF THE PREFERRED EMBODIMENTS

Figure 1:
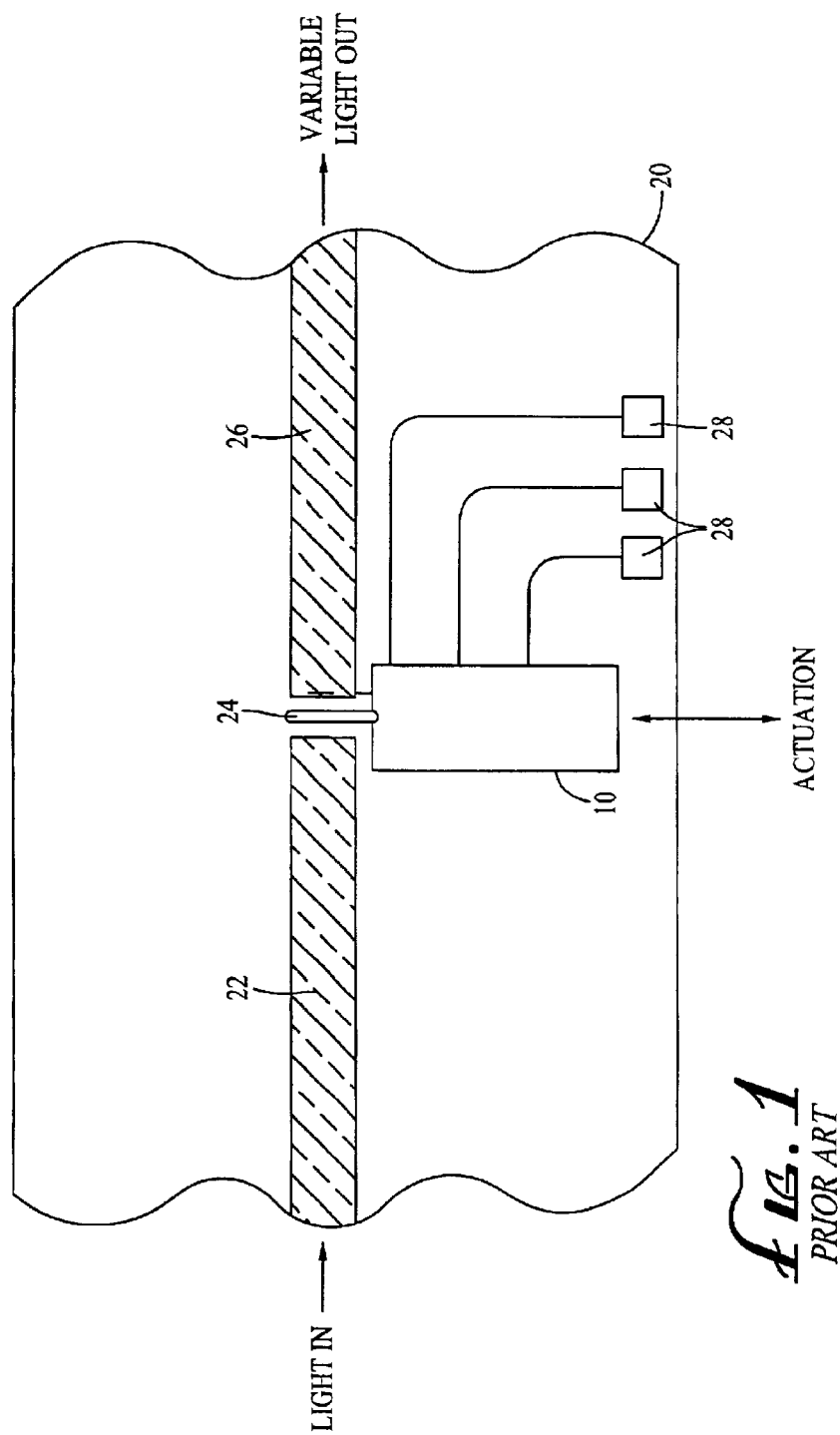
FIG. 1 is a schematic illustration of a prior art variable attenuator which has a shutter.

The improved device for changing the optical intensity of an optical signal uses a light transmissive structure, preferably a movable waveguide, whose position determines the amount of free space through which the optical signal must travel, thereby variably attenuating light. The phrase "light transmissive structure" includes structures that are optically transmissive such as waveguides and optical fibers, but not air gaps, mirrors and shutters.

FIGS. 2A and 2B are illustrations of an example embodiment of a device 30 that changes the optical intensity of an optical signal by using a light transmissive structure such as a waveguide disposed on a movable platform, where FIG. 2A illustrates the movable platform in a first position and FIG. 2B illustrates the movable platform in a second position. Two stationary waveguides 32, 34 are positioned adjacent to the input and output of a movable waveguide 36. When the movable waveguide 36 is aligned with the stationary waveguides 32, 34 as shown in FIG. 2A, light from the source 38 is guided across through the movable waveguide 36. When the movable waveguide 36 is moved completely away from the stationary waveguides 32, 34, as in FIG. 2B, the input light has to traverse across free space 40. By setting the distance of the free space between the fixed waveguides 32, 34 such that a minimal amount of light is captured in the output fixed waveguide 34, significant optical attenuation can be achieved (e.g., up to 100% attenuation). To adjust the amount of light transmitted, the movable waveguide 36 is inserted into the light path to allow for the desired amount of light to pass through (e.g., up to 100% transmission). The movable waveguide 36 essentially acts as a variable conduit bridging the two junctions. Thus, the improved device 30 uses free space as a means of attenuating light and a movable waveguide 36 to variable adjust the amount of light passing from the input waveguide 32 to the output waveguide 34.

FIG. 3 illustrates another example embodiment of a device for attenuating light by moving a waveguide 50 relative to stationary waveguides 52, 54. FIG. 3 attenuates light by rotating the movable waveguide 50 so that less or no light is transmitted from the input waveguide 52 into the movable waveguide 50. In this example, less or no light is transmitted also from the movable waveguide 50 into output wave guide 54. A maximum amount of light is transmitted when the movable waveguide 50 is aligned with the stationary waveguides 52, 54. When the movable waveguide 50 is rotated such that the entry surface of the movable waveguide 50 is blocked from receiving light from the input stationary waveguide 52, the transmission of light is completely terminated. Rotating the movable waveguide 50 to an intermediate position makes it possible for a portion of the light to be transmitted.

FIG. 4 illustrates yet another example embodiment of a device for using a movable waveguide 60 to attenuate light. In this example, light is attenuated by the air gap 62 between the stationary input waveguide 64 and the movable waveguide 60. This approach requires relatively larger movement (several millimeters) to translate the movable waveguide 60 in order to completely attenuate light. To couple light laterally into the stationary output waveguide 66, a prism coupler 68 will be required. The use of prism coupler 68 is well known to those skilled in the art of waveguide designs. In an alternative embodiment to FIG. 3 or 4, other light transmissive structures may be used in place of one or more of the waveguides.

Figure 5:
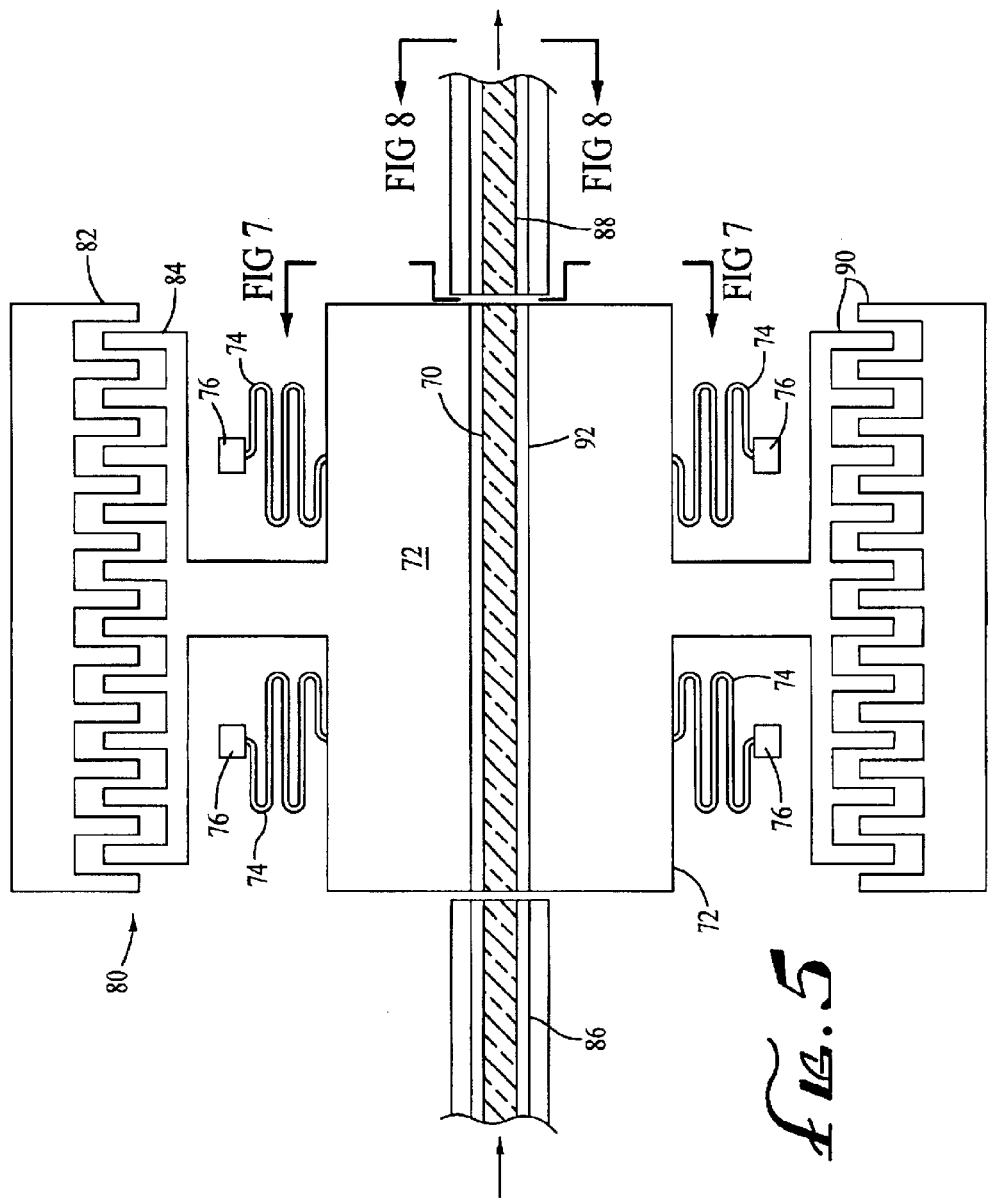
FIG. 5 is a schematic illustration of an example embodiment of a device that changes the optical intensity of an optical signal by using a light transmissive structure such as a waveguide disposed on a movable platform, which illustration includes structures associated with the moving platform.

FIG. 5 illustrates a VOA device which uses a movable waveguide 70 and is fabricated with a MEMS micromachining manufacturing process. The device includes a waveguide 70 integrated on top of a movable platform 72. The movable platform 72 is supported on springs 74, which are connected to anchors 76 tied to the substrate. The movable platform 72, springs 74 and anchors 76 are all preferably produced from the same layer of material. To enable the platform 72 to move, an air gap (not illustrated) underneath the platform 72 is used so that the platform 72 is supported completely on the springs 74. There are several methods of producing a structure which is capable of being freely suspended; these methods are well known to those skill in the art of micromachining. Materials such as silicon, silica, nitrite and metals have all been made successfully into freely-suspended micro-structures. Any appropriate material may be used in the VOA device.

To move the platform 72, actuators 80 are connected to the platform 72. A widely used actuator is the inter-digitated structure referred to as "comb fingers" because of their resemblance to combs. Preferably, the actuators 80 of the VOA uses inter-digitated structures. Such inter-digitated structures can be easily produced on the same layer as the platform 72. A set of comb fingers 84 is patterned onto the movable platform 72, while an opposing set 82 is patterned and fixed to the substrate. To actuate the actuators 80, an electrical voltage differential is applied to the fixed electrode 82 and the movable electrode 84. The resulting voltage differential generates an electrostatic attraction force and pulls the movable platform 72 toward the fixed electrode 82. Other actuation techniques could also be used. Examples include actuators whose operation is based on thermal, magnetic and/or piezoelectric drives. The design of actuators is well known to those skilled in the art of designing micromachined structures.

The movable platform 72 supports a waveguide 70 that bridges two adjacent and stationary waveguides 86, 88. By applying a varying level of electrical voltage to the actuator 80, the movable waveguide 70 can be moved by any desired amount. For precise movements, the comb fingers of the actuator 80 can be connected to a position sensing circuit, which preferably is coupled to movable and fixed sensing comb fingers 90, also referred to as position sensing electrodes. The change in the relative position between movable and fixed sensing comb fingers 90 generates a change in the electrical capacitance between the fingers; this change can be detected and converted into electrical voltages through proper detection circuits. Commercial capacitance-to-voltage conversion chips are available. The position signal could also be used in a closed-loop control circuit to hold the movable waveguide 70 in a fixed position. The use of position circuits and control algorithms are well known to those skilled in the art of micromachine control. Other means of sensing such as those based on piezo-resistive, magnetic and/or optical methods are also viable.

Referring to FIG. 5, an optical signal is connected to the input waveguide 86, which preferably is mounted on a stationary platform which aligns the input waveguide 86 with the movable waveguide 70. On command from the system to attenuate power, an electrical voltage is send to the actuator 80 to move the movable waveguide 70. The actual power of light transmitted can be monitored from the output waveguide 88, which preferably is mounted on a stationary platform which aligns the outut waveguide 88 with the movable waveguide 70. Electrical power is applied to the actuator 80 until the desired attenuation is achieved. To lock onto the desired attenuation, the position of the movable waveguide 70 is "fixed" by monitoring the output voltage of the position sensing electrodes 90 or the power optical signal. Buffering or cladding 92 for the waveguides may be used as well.

Figure 6:
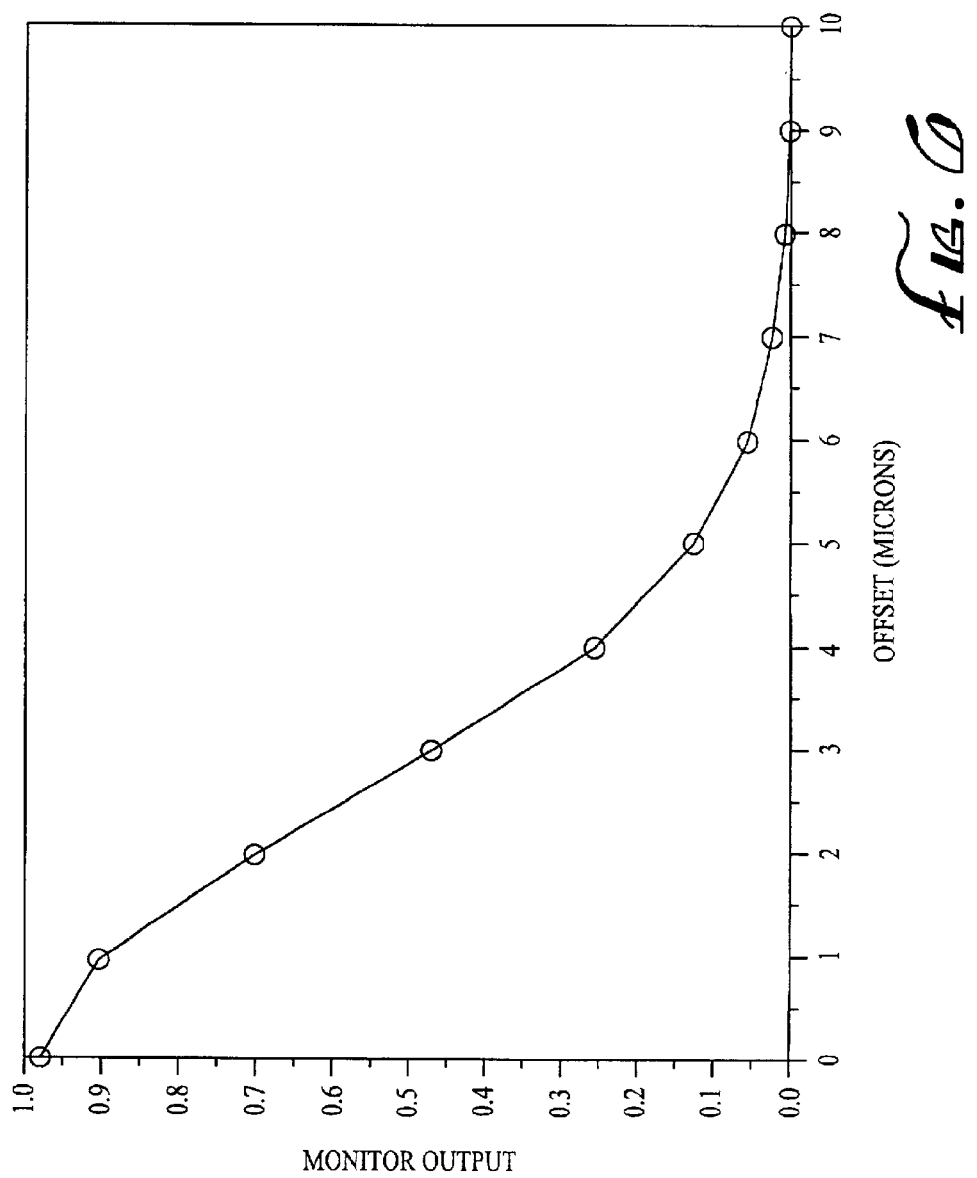
FIG. 6 is a schematic graph of the light output versus the offset in microns.

FIG. 6 is a graph of the monitored output light power on the Y axis and the offset in microns on the X axis for a simulated design of a movable waveguide having the following dimensions: 6 micron width, 6 micron height, and 2 mm long. The transmitted power is slightly less than 100% due to loss across the air gap. This loss can be reduced by using an index matching gel or by coating the face of the waveguides with anti-reflection film. As the movable waveguide 70 is moved, light is attenuated until approximately 10 microns of movement. The resulting attenuation for the given geometry is about −27 dB. Higher attenuation is also achievable with further optimization.

Figure 7:
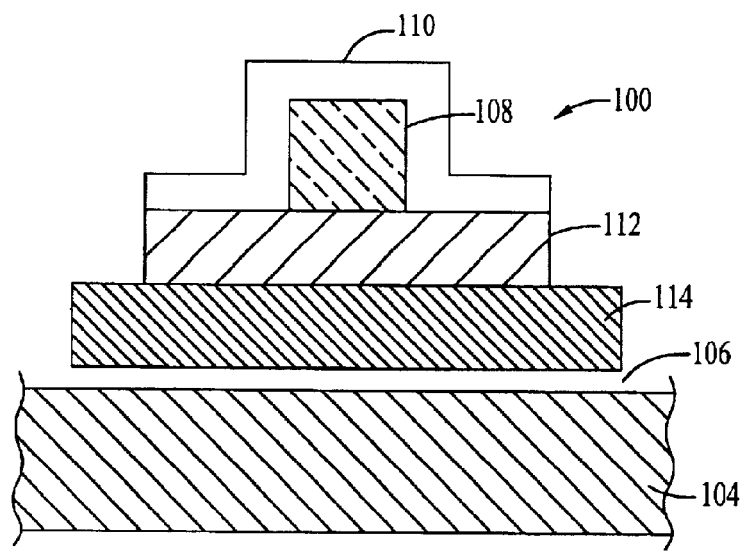
FIG. 7 is a schematic cross-sectional view of a movable waveguide having an air gap.
Figure 8:
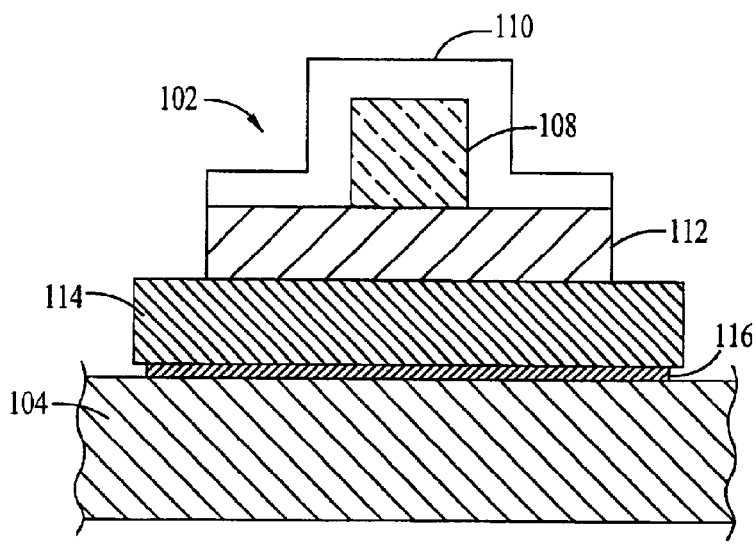
FIG. 8 is a schematic cross-sectional view of a stationary waveguide resting on an oxide layer of a substrate.

FIGS. 7 and 8 illustrate cross sectional views of a movable and a stationary waveguide. FIG. 7 shows a suspended waveguide 100, while FIG. 8 shows a stationary waveguide 102 positioned on top of the substrate 104. The movable waveguide 100 is suspended over an air gap 106 over the substrate 104. The movable waveguide 100 preferably includes a core 108 surrounded at least partially by a cladding 10 and a buffer 112. The buffer 112 rests on a silicon layer 114. Turning to FIG. 8, the stationary waveguide 102 preferably includes a core 108 surrounded at least partially by a cladding 110 and a buffer 112. The buffer 112 rests on a silicon layer 114, which in turn rests on an oxide layer 116 on the substrate 104.

Figure 9:
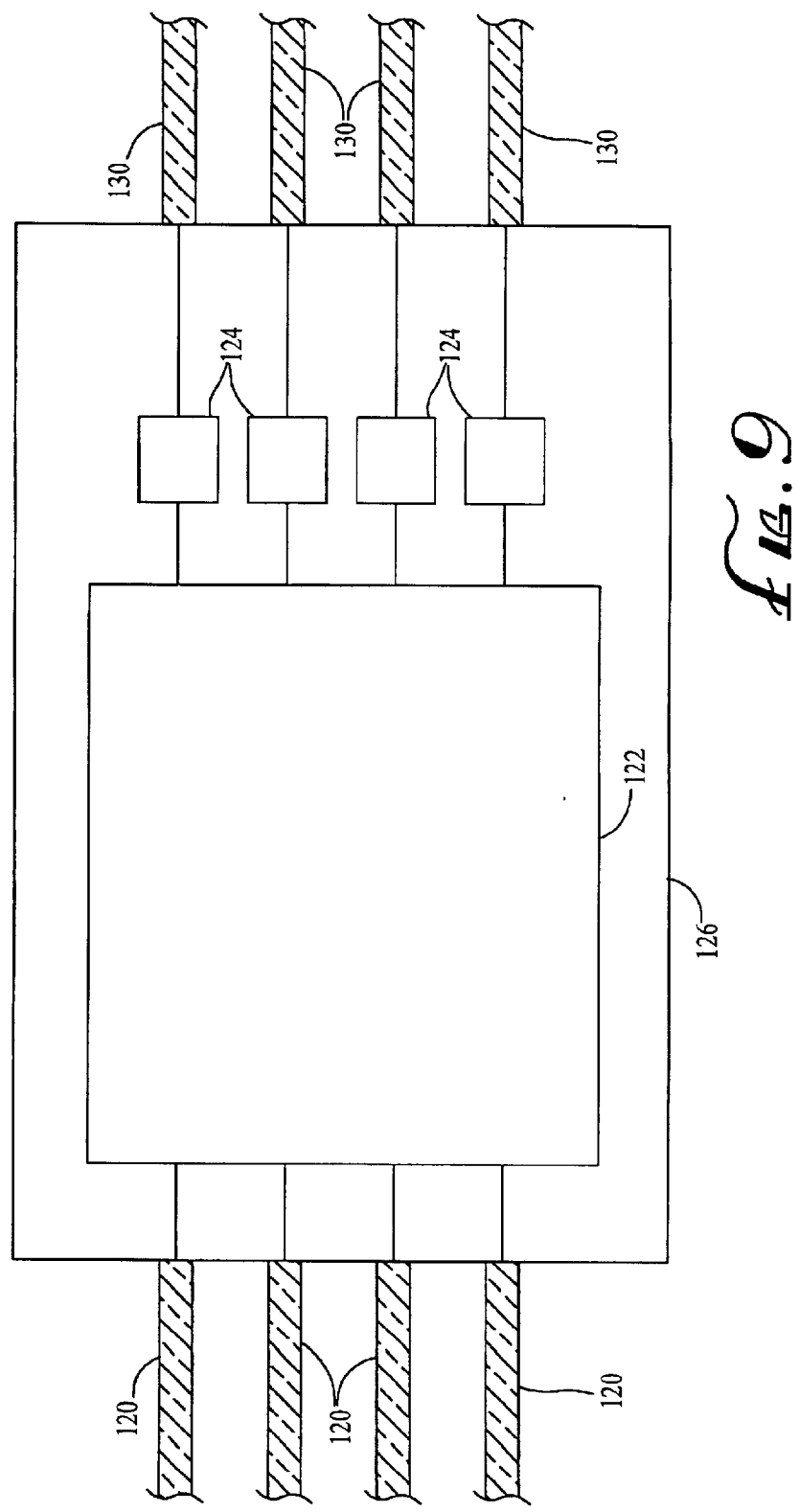
FIG. 9 is a schematic illustration of an example embodiment of a 4×4 optical switch coupled to VOAs.

FIG. 9 illustrates an example of integrating the improved device with an optical switch. For switches with a smaller number of ports, the range of the output power will be small, but for switches having a large number of ports, the range of output power can vary significantly due to the greater number of different paths which can be taken by each optical signal. A large range in the switch output would be undesirable and will require using VOAs to equalize the output. For such an optical switch, the use of any of the improved devices described in this patent specification will greatly simplify the integration of a VOA and the optical switch using the same manufacturing process. For example, input optical fibers 120 are coupled to a 4×4 optical switch 122. The 4×4 optical switch 122 is coupled to VOAs 124, each VOA being one of the improved devices described herein. The 4×4 optical switch 122 and VOAs 124 are mounted to a common substrate 126. Because there are 4 output ports in this example, there are 4 VOAs 124. Each of the four VOAs 124 is coupled to an output optical fiber 130. Each VOA 124 may be separately controlled to attenuate the light as desired.

While various embodiments of the application have been described, it will be apparent to those of ordinary skill in the art that many more embodiments and implementations are possible that are within the scope of the subject invention. For example, each feature of one embodiment can be mixed and matched with other features shown in other embodiments. Features and processes known to those of ordinary skill in the art of optics and semiconductor processing may similarly be incorporated as desired. Additionally and obviously, features may be added or subtracted as desired. Accordingly, the invention is not to be restricted except in light of the attached claims and their equivalents.

What is claimed is:

1. A method of attenuating an optical signal comprising:
   providing a micro-electro mechanical device comprising:
      an optical path for an optical signal, the optical path extending from a first light transmissive structure to a second light transmissive structure;
      a movable platform formed by a semiconductor process with the second light transmissive structure being disposed thereon such that when the movable platform is in a first position, the second light transmissive structure is aligned to receive the optical signal which is substantially unattenuated from the first light transmissive structure and when the movable platform is in a second position, the second light transmissive structure is aligned to receive the optical signal which is attenuated from the first light transmissive structure; and an actuator formed by a semiconductor process; and using the actuator to move the movable platform to the second position.

2. The method of claim 1 wherein when the movable platform is in the second position, the optical signal emerging from the first light transmissive structure diffracts over free space for a distance before the optical signal enters the second light transmissive structure.

3. The method of claim 1 wherein when the movable platform is in the first position, the optical signal emerging from the first light transmissive structure propagates over a narrow air gap before the optical signal enters the second light transmissive structure and when the movable platform is in the second position, the optical signal emerging from the first light transmissive structure propagates over a wider air gap before the optical signal enters the second light transmissive structure.

4. The method of claim 1 wherein when the movable platform is in the second position, the optical signal emerging from the first light transmissive structure is substantially attenuated to zero or near zero.

5. The method of claim 1 wherein the second light transmissive structure is a waveguide.

6. The method of claim 1 wherein the second light transmissive structure is an optical fiber.

7. The method of claim 1 wherein the micro-electro mechanical device further comprises a third light transmissive structure wherein when the movable platform is in the first position, the second light transmissive structure propagates the optical signal to the third light transmissive structure and when the movable platform is in a second position, the second light transmissive structure propagates an attenuated optical signal to the third light transmissive structure.

8. The method of claim 1 wherein as the movable platform moves away from the first position, less of the optical signal propagates from the first light transmissive structure to the second light transmissive structure.

9. The method of claim 7 wherein as the movable platform moves away from the first position, less of the optical signal propagates from the second light transmissive structure to the third light transmissive structure.

10. The method of claim 7 wherein the second light transmissive structure is a waveguide.

11. The method of claim 7 wherein the second light transmissive structure is an optical fiber.

12. The method of claim 10 wherein the first light transmissive structure is a waveguide or an optical fiber.

13. The method of claim 11 wherein the first light transmissive structure is an optical fiber or an optical fiber.

14. The method of claim 12 wherein the third light transmissive structure is a waveguide or an optical fiber.

15. The method of claim 1 wherein the first light transmissive structure is a waveguide or an optical fiber.

16. A method of attenuating an optical signal comprising:
providing a micro-electro mechanical device comprising:
an optical path for an optical signal, the optical path extending from a first light transmissive structure to a second light transmissive structure;
a movable platform formed by a semiconductor process with the first light transmissive structure being disposed thereon such that when the movable platform is in a first position, the first light transmissive structure is aligned to transmit the optical signal which is substantially unattenuated to the second light transmissive structure and when the movable platform is in a second position, the first light transmissive structure is aligned to transmit the optical signal which is attenuated to the second light transmissive structure; and an actuator formed by a semiconductor process; and using the actuator to move the movable platform to the second position.

17. The method of claim 16 wherein when the movable platform is in the second position, the optical signal emerging from the first light transmissive structure diffracts over free space for a distance before the optical signal enters the second light transmissive structure.

18. The method of claim 16 wherein when the movable platform is in the first position, the optical signal emerging from the first light transmissive structure propagates over a narrow air gap before the optical signal enters the second light transmissive structure and when the movable platform is in the second position, the optical signal emerging from the first light transmissive structure propagates over a wider air gap before the optical signal enters the second light transmissive structure.

19. The method of claim 16 wherein when the movable platform is in the second position, none of the optical signal emerging from the first light transmissive structure enters the second light transmissive structure.

20. The method of claim 16 wherein the second light transmissive structure is a waveguide or an optical fiber.

21. The method of claim 20 wherein the first light transmissive structure is a waveguide or an optical fiber.

22. The method of claim 16 wherein as the movable platform moves away from the first position, less of the optical signal propagates from the first light transmissive structure to the second light transmissive structure.

23. A system for attenuating an optical signal, the system comprising:
a substrate; and
a micro-electro mechanical device located on the substrate, the micro-electro mechanical device comprising:
a movable structure formed by a semiconductor process to be suspended over the substrate or over a cavity in the substrate;
an actuator formed by a semiconductor process and coupled to the movable structure to move the movable structure;
a first waveguide disposed on the movable structure;
a second waveguide adjacent to the first waveguide;
wherein when the movable structure is in a first position, the optical signal propagates between the first and second waveguides and when the movable structure is in a second position, an attenuated optical signal propagates between the first and second waveguides.

24. The system of claim 23 wherein the second waveguide is an input waveguide adjacent to the input of the first waveguide, wherein when the movable structure is in the first position, the optical signal propagates from the second waveguide to the first waveguide and when the movable structure is in the second position, an attenuated optical signal propagates from the second waveguide to the first waveguide.

25. The system of claim 23 wherein the second waveguide is an output waveguide adjacent to the output of the first waveguide, wherein when the movable structure is in the first position, the optical signal propagates from the first waveguide to the second waveguide and when the movable structure is in the second position, an attenuated optical signal propagates from the first waveguide to the second waveguide.

26. The system of claim 24 further comprising a third waveguide adjacent to the output of the first waveguide, wherein when the movable structure is in the first position, the optical signal propagates from the first waveguide to the third waveguide and when the movable structure is in the second position, an attenuated optical signal propagates to the third waveguide.

27. The system of claim 26 wherein when the movable structure is in the first position, the first waveguide is aligned with the second and third waveguides such that the optical signal propagates from the second waveguide to the first waveguide to the third waveguide, and when the movable structure is in the second position, the first waveguide is not aligned with the second waveguide or the third waveguide such that an attenuated optical signal propagates from the second waveguide to the first waveguide or from the first waveguide to the third waveguide.

28. The system of claim 23 wherein a free space is located between the first and second waveguides, and when the movable structure is in the first position, the free space has a length extending between the first and second waveguides, and when the movable structure is in the second position, the length of the free space is increased, the free space attenuating the optical signal.

29. The system of claim 25 wherein a free space is located between the first and second waveguides, and when the movable structure is in the first position, the free space has a length extending between the first and second waveguides, and when the movable structure is in the second position, the length of the free space is increased, the free space attenuating the optical signal.

30. The system of claim 26 wherein a first free space is located between the first and second waveguides and a second free space is located between the first and third waveguides, and when the movable structure is in the first position, the first free space has a length extending between the first and second waveguides and the second free space has a length extending between the first and third waveguides, and when the movable structure is in the second position, the lengths of the first and second free spaces are increased.

31. The system of claim 23 wherein the movable structure moves in a single direction.

32. The system of claim 23 wherein the movable structure rotates.

33. The system of claim 25 wherein the movable structure moves in a single direction.

34. The system of claim 25 wherein the movable structure rotates.

35. The system of claim 26 wherein the movable structure moves in a single direction.

36. The system of claim 26 wherein the movable structure rotates.

37. The system of claim 28 wherein the movable structure moves in a single direction.

38. The system of claim 28 wherein the movable structure rotates.

39. The system of claim 30 wherein the movable structure moves in a single direction.

40. The system of claim 30 wherein the movable structure rotates.

41. The system of claim 23 wherein the second waveguide is a stationary waveguide or an optical fiber.

42. The system of claim 24 wherein the second waveguide is a stationary waveguide or an optical fiber.

43. The system of claim 25 wherein the second waveguide is a stationary waveguide or an optical fiber.

44. The system of claim 26 wherein the second waveguide is a stationary waveguide or an optical fiber.

45. The system of claim 28 wherein the second waveguide is a stationary waveguide or an optical fiber.

46. The system of claim 29 wherein the second waveguide is a stationary waveguide or an optical fiber.

47. The system of claim 30 wherein the second waveguide is a stationary waveguide or an optical fiber.

48. The system of claim 26 wherein the third waveguide is a stationary waveguide or an optical fiber.

49. The system of claim 30 wherein the third waveguide is a stationary waveguide or an optical fiber.

50. The system of claim 44 wherein the third waveguide is a stationary waveguide or an optical fiber.

51. The system of claim 47 wherein the third waveguide is a stationary waveguide or an optical fiber.

52. A semiconductor device for attenuating an optical signal, the device comprising:
   a substrate;
   a movable structure formed by a semiconductor process to be suspended over the substrate or over a cavity in the substrate;
   an actuator formed by a semiconductor process and coupled to the movable structure to move the movable structure;
   a first waveguide disposed on the movable structure;
   a second waveguide adjacent to the input of the first waveguide;
   a third waveguide adjacent to the output of the first waveguide; and
   a prism coupler coupled between the first and third waveguides, the prism coupler propagating the optical signal from the first waveguide to the third waveguide;
   wherein when the movable structure is in a first position, the optical signal propagates between the first and second waveguides and when the movable structure is in a second position, an attenuated optical signal propagates between the first and second waveguides.

53. The device of claim 52 wherein the movable structure moves such that an air gap between the first and second waveguides changes, thereby variably attenuating the optical signal.

54. The device of claim 52 wherein the first waveguide has a curve.

55. The device of claim 53 wherein the second waveguide is a stationary waveguide or an optical fiber.

56. The device of claim 53 wherein the third waveguide is a stationary waveguide or an optical fiber.

57. The system of claim 23 further comprising a spring coupled to the movable structure and fixed to the substrate, the movable structure being suspended by the springs over the substrate or over the cavity in the substrate.

58. The system of claim 23 further comprising an activation electrode coupled to the movable structure and an actuation electrode positioned to interact electrostatically with the activation electrode.

59. The system of claim 58 wherein the actuation electrode and activation electrode are inter-digitized.

60. The system of claim 23 further comprising a sensing electrode for determining the position of the movable structure.

61. A semiconductor device for attenuating an optical signal, the device comprising:
- a substrate;
- a movable structure formed by a semiconductor process to be suspended over the substrate or over a cavity in the substrate;
- an actuator formed by a semiconductor process and coupled to the movable structure to move the movable structure;
- a first waveguide disposed on the movable structure;
- a second waveguide adjacent to the first waveguide, the second waveguide is a stationary waveguide or an optical fiber and is disposed on the substrate;
- wherein when the movable structure is in a first position, the optical signal propagates between the first and second waveguides and when the movable structure is in a second position, an attenuated optical signal propagates between the first and second waveguides.

62. The device of claim 61 wherein the second waveguide comprises a core, a cladding layer which covers at least part of the core, and a buffer layer which covers at least part of the core, the buffer being disposed on a silicon layer, the silicon layer being disposed on the oxide layer on the substrate.

63. A semiconductor device for attenuating an optical signal, the device comprising:
- a substrate;
- a movable structure formed by a semiconductor process to be suspended over the substrate or over a cavity in the substrate;
- an actuator formed by a semiconductor process and coupled to the movable structure to move the movable structure;
- a first waveguide disposed on the movable structure, the first waveguide comprising a core, a cladding layer which covers at least part of the core, a buffer layer which covers at least part of the core, the buffer being disposed on a silicon layer, and an air gap between silicon layer and the substrate;
- a second waveguide adjacent to the first waveguide;
- wherein when the movable structure is in a first position, the optical signal propagates between the first and second waveguides and when the movable structure is in a second position, an attenuated optical signal propagates between the first and second waveguides.

64. The system of claim 23 further comprising an optical switch, the output of the optical switch being coupled to the device such that the device variably attenuates the optical signal that is output from the optical switch.

65. The system of claim 64 wherein the optical switch and the device are formed on the same substrate.

66. The system of claim 23 comprising:
- a plurality of devices each comprising an optical switch including a plurality of outputs, each output being coupled to one of a second plurality of devices;
- the second plurality of devices, each comprising:
  - a movable structure suspended over the substrate or over a cavity in the substrate;
  - an actuator coupled to the movable structure to move the movable structure;
  - a first waveguide disposed on the movable structure;
  - a second waveguide adjacent to the first waveguide;
  - wherein when the movable structure is in a first position, the optical signal propagates between the first and second waveguides and when the movable structure is in a second position, an attenuated optical signal propagates between the first and second waveguides;
  - wherein the second waveguide is an output waveguide adjacent to the output of the first waveguide, wherein when the movable structure is in the first position, the optical signal propagates from the first waveguide to the second waveguide and when the movable structure is in the second position, an attenuated optical signal propagates from the first waveguide to the second waveguide.

67. The system of claim 23 wherein when the movable structure is in the first position, the first waveguide is aligned with the second waveguide and when the movable structure is in the second position, the first waveguide is not aligned with the second waveguide.

68. The system of claim 24 wherein the first waveguide is an optical fiber.

69. The system of claim 25 wherein the first waveguide is an optical fiber.

70. The system of claim 26 wherein the first waveguide is an optical fiber.

71. The system of claim 28 wherein the first waveguide is an optical fiber.

72. The system of claim 29 wherein the first waveguide is an optical fiber.

73. The system of claim 30 wherein the first waveguide is an optical fiber.

* * * * *